INVENTORS
ERNEST O. KARTINEN
FRED E. AKERLUND
BY
ATTORNEYS

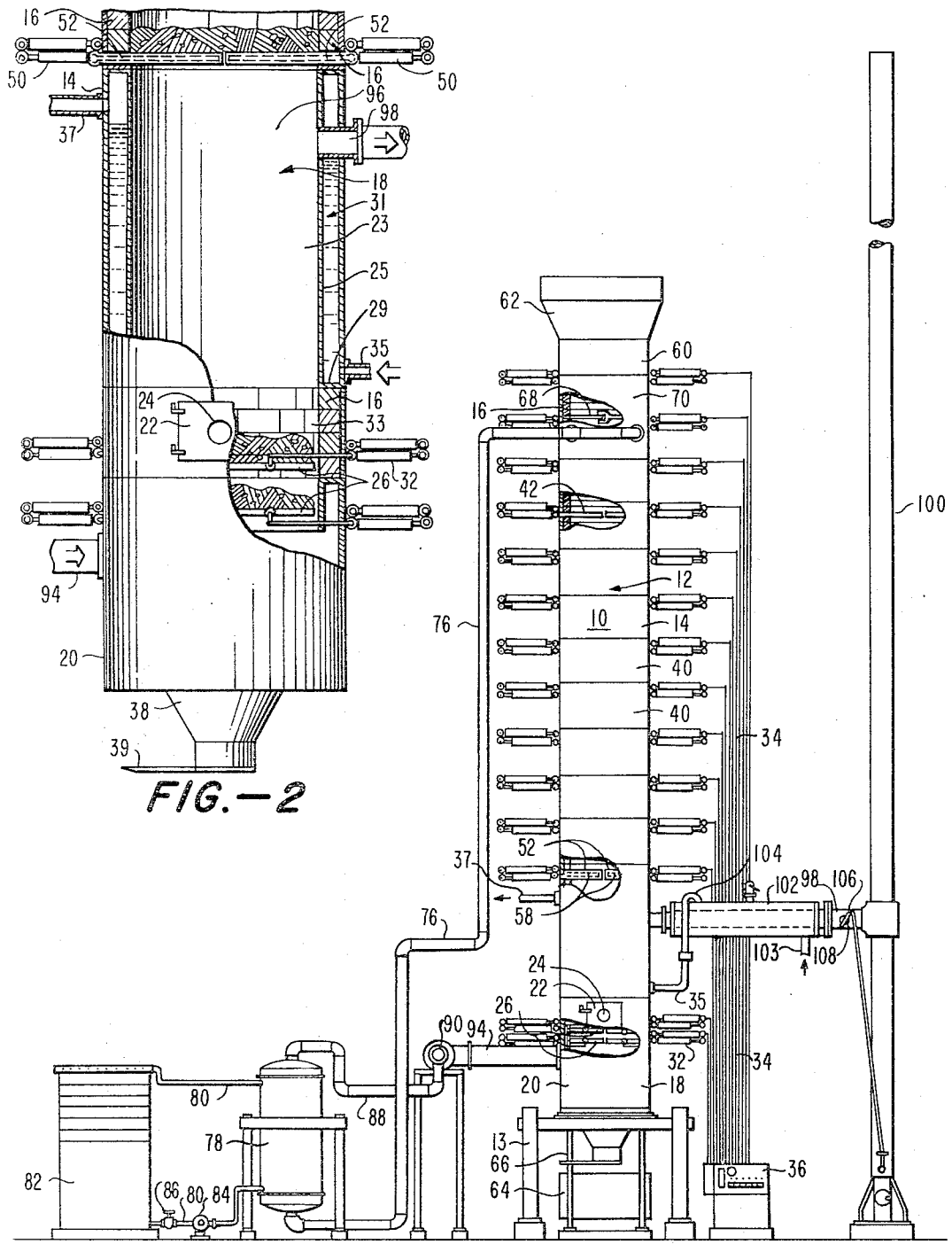
Feb. 14, 1967   E. O. KARTINEN ET AL   3,303,798
REFUSE INCINERATING PROCESS AND APPARATUS
Filed April 22, 1964   3 Sheets-Sheet 1
FIG.—2
FIG.—1
INVENTORS
ERNEST O. KARTINEN
FRED E. AKERLUND
BY
*Fraser & Bogucki*
ATTORNEYS

INVENTORS
ERNEST O. KARTINEN
FRED E. AKERLUND

ATTORNEYS

3,303,798
REFUSE INCINERATING PROCESS AND APPARATUS
Ernest O. Kartinen, Long Beach, and Fred E. Akerlund, Hermosa Beach, Calif., assignors to Signal Oil and Gas Company, Los Angeles, Calif.
Filed Apr. 22, 1964, Ser. No. 361,836
14 Claims. (Cl. 110—11)

The present invention generally relates to the disposal of combustibles and more particularly relates to an improved process and apparatus for incinerating refuse and the like.

The problem of efficient permanent disposal of large volumes of garbage, rubbish and trade waste which comprise refuse is becoming increasingly important and difficult, particularly in view of the rapid expansion of population in urban and suburban areas.

Garbage is all putrescible animal and vegetable matter resulting from the handling, preparation, cooking and consumption of food. Rubbish is defined as solids not considered to be highly inflammable or explosive, and includes rags, old clothes, leather, rubber, carpets, wood, excelsior, paper, ashes, tree branches, tree leaves, yard trimmings, furniture, tin cans, glass, crockery, masonry and similar materials. Trade waste is all solid, liquid or gaseous materials or rubbish resulting from construction, building operations or the prosecution of any business or trade or industry. It includes plastic products, cartons, paint, grease, oil and other petroleum products, chemicals, cinders and other forms of solid, liquid or gaseous waste materials.

There is a necessity for incinerating apparatus which can reduce combustible refuse to ashes without significant smoke production and which can process large volumes of such refuse on a continuous year-in, year-out basis. In many large urban and suburban areas, garbage dumping is no longer feasible, due to high land values, sanitation problems and the like. Yet, most existing refuse incinerators either are not adapted for the processing of sufficiently large volumes of refuse to avoid some accumulation of such refuse, or they present such a serious smoke problem that they are not acceptable for commercial use. This is particularly true where smog abatement programs have been instituted. Such programs require that these incinerators be fitted with costly supplementary smoke control equipment. Moreover, most incinerators of substantial size and through-put volume are of relatively complicated construction and of very high initial cost. Such construction usually renders them difficult to repair, and total shutdowns may be required to effect repairs. A further drawback of many existing commercial incinerators is their inability to process, perse, refuse of all sizes and types. Instead, supplementary sorting equipment and refuse grinding equipment to reduce the refuse to small size must be employed before the refuse can be passed to the incinerator. Obviously, this increases the overall cost of refuse disposal. So also does the use of external fuel which is required to maintain combustion in the fireboxes of many incinerators. Furthermore, most existing incinerators do not incorporate simple integrated components capable of recovering useful by-products from the combustion gases.

Accordingly, a principal object of the present invention is to provide improved incineration of combustible refuse.

It is a further object of the present invention to provide an improved refuse incinerating apparatus and an improved process of incinerating combustible refuse, which apparatus and process are adapted for the smokeless destruction of refuse.

It is also an object of the present invention to provide an inexpensive, simple refuse incinerating apparatus capable of continuous operation at a high throughput.

It is a further object of the present invention to provide a simple, inexpensive, durable and efficient combustible refuse incinerating apparatus, capable of incinerating unground, unsorted wet or dry combustible refuse, and including means for the recovery of valuable by-products from combustion gases produced during incineration.

It is a still further object of the present invention to provide an improved continuous process for completely incinerating wet or dry combustible refuse of any reasonable size and type to smoke-free combustion gases and ashes.

It is also an object of the present invention to provide a garbage incineration process which is adaptable to continuous large throughput use under essentially automatically controlled conditions, which process substantially elminates the necessity of employing externally introduced commercial fuel.

It is a still further object of the present invention to provide an improved refuse process and apparatus which allow readily controllable heat recovery and dissipation.

The foregoing and other objects are accomplished, in accordance with the present invention, by providing an improved high temperature incineration process capable of operating with a carefully controlled and balanced heat loss and recovery for complete combustion of combustible refuse to combustion gases comprising carbon dioxide and water vapor, and to ashes. The process also features a balanced control of gas volumes and gas velocities to avoid gas lifting of solids in the system. In addition, the process is characterized as a high temperature process capable of efficiently operating without use of external fuel.

In the natural process of burning of combustibles, much heat is consumed before ignition takes place. Thus, in the case of refuse a certain amount of heat is first necessary to distill off the moisture, and a second portion of heat is then used to raise the temperature of the dried material to its ignition point. The overall efficiency of an incineration process determines how much additional heat must be supplied to the system in order to satisfy radiation losses, as well as other losses of heat from the system.

Once the ignition point of the combustible refuse has been reached, a portion of such matter is changed to gases. In a complete combustion process, these gases are carbon dioxide and water. The remaining portion of such matter is converted to ash. This conversion can usually be achieved only at a relatively high temperature of, for example, about 1500–2000° F. or higher. In any incineration process, a certain amount of air must be introduced to the combustion zone in order to bring about the desired combustion reaction, and it would be highly desirable if a similar amount of combustion gases could be exhausted from the system so as to maintain a balanced volume of gases in the system.

The combustion process itself produces heat, and during total combustion, the heat produced is considerable. However, many present-day incineration systems fail to provide complete combustion of refuse. This in some instances is due, in part, to the fact that they do not provide a balanced volume of gases in the system and/or they do not provide carefully balanced heat control. Many processes depend on external fuel to compensate for heat losses, and others do not operate at a sufficiently high temperature to provide complete combustion of refuse in the combustion zone. In a truly efficient incineration system, excess heat is produced due to complete combustion in the combustion zone, and the heat developed in the system over and above that needed to bring about ignition or combustion will, of necessity, have to be disposed of as excess heat in order to maintain a heat balance in the system.

The present process is characterized by providing that a part of this excess heat is used to heat air or oxygen which enters into the combustion zone to replace oxygen converted to carbon dioxide by reaction during combustion. Another amount of excess heat escapes from the present system with the removal of hot non-combustibles and ashes. A third portion of the excess heat exits the system in the form of the heated exhaust combustion gases. Thus, heat balance is maintained in the present system for complete combustion of refuse without use of external fuel.

In the present process, when refuse is incinerated an average of approximately 1500 B.t.u. of heat per pound of refuse is consumed before ignition takes place. This indicates that all B.t.u.'s per pound of refuse above 1500 B.t.u. are available for other uses.

In addition to the 1500 B.t.u. consumed, as described, in the present process, another approximately 1000 B.t.u. are usually exhausted from the system in the exhaust combustion gases. Accordingly, the refuse incinerated by the present process usually has a minimum heat content of about 2500 B.t.u. Most types of refuse meet this requirement. The average refuse has a B.t.u. value of about 4200/lb. Some refuse has up to 7000 B.t.u./lb. If desired, a portion of the heat content of the refuse above 1500 B.t.u. can also be salvaged, as by heat exchanging with the exhaust combustion gases, etc. All heat content above the minimum of about 2500 B.t.u. from the refuse usually is removed from the system, as previously described, in order to keep the system heat balanced.

In addition to those ways previously described, several other ways of disposing of this excess heat can be practiced. Thus, the original heat content of the refuse can be lowered by adding water to the refuse. In this way a portion of the excess heat is used to drive off this water. However, this technique has a serious disadvantage. If the amount of heat required in the recycle section of the present system were increased, as by watering the refuse, the amount of recycle gas would also increase. The velocity of the draft in the system depends on the volume of recycle gas which is being used along with fresh air. If the velocity were to become too high it would be necessary to slow the burning rate or lower the efficiency of the process. Instead, it is preferred to exert improved heat control through the use of water cooled walls in the combustion chamber. All the excess available heat can be removed and the temperature of the furnace can be carefully controlled. It will be noted that this is in contrast to the conventional incinerator system which dissipates excess heat merely by adding excess cold air to the system and then removing the excess air along with the combustion gases. However, such a conventional heat dissipating means is not efficient, does not provide a balanced gas volume and often results in gas lifting of ashes up the stack, with resulting pollution. In the present process the amount of fresh air entering the system is carefully controlled and limited, as well as the amount of recycle combustion gas and the amount of exhaust combustion gas, so as to stabilize the system and avoid gas lifting of ash and a decrease in combustion efficiency.

The improved features described are provided because of the particular arrangement of components in the present system. Thus, the system provides successive drying, heating and carbonizing of combustible refuse in a plurality of vertically stacked treating zones by countercurrent contacting of the refuse with ascending hot combustion gases. The refuse is held up in each treating zone as a layer of substantially uniform cross-section disposed across the path of combustion gases passing upwardly therethrough for maximum contact therewith and for a time sufficient to effect substantial treatment of the refuse with the combustion gases. Accordingly, uniform drying, heating and carbonizing of refuse are provided by the present process. This assures that refuse reaching the combustion zone has been completely stripped of smoke-producing combustibles and is in the fully carbonized state so that combustion gases exhausted from the combustion zone are smoke-free and constitute carbon dioxide and water vapor and, accordingly, can be safely passed from the system to the atmosphere without pollution. An excess of carbonized material is maintained in the combustion zone at all times to strip oxygen from the combustion gases, thereby assuring that no combustion will take place in the treating zones themselves.

The heat generated by the combustion of the refuse is divided three ways. One portion leaves the system through the exhaust gases, and a second portion leaves the system through water cooled grates and other areas of the combustion chamber. A third portion in the form of recycling combustion gases is used to process the refuse. This third portion of heat is held to a minimum in order to minimize the volume of recycle gases. Approximately 50 percent, by volume, of the combustion gases from the combustion zone are recycled as a stream up through the stacked carbonizing, heating and drying zones, so that smoke-producing combustibles in the refuse in those zones are essentially completely stripped from the refuse and pass into such stream. The thus-laden combustion gases then are withdrawn as a stream and are preferably passed through a condensation zone to strip them of valuable liquefiable materials. The remaining uncondensed combustion gases are then mixed with a controlled concentration of fresh oxygen-containing gases just sufficient to replace the volume of gases exhausted from the system and just sufficient to promote combustion in the combustion zone. Accordingly, the gas volume balance is maintained for the system.

The resulting gaseous mixture, which may also contain entrained carbonaceous particles, is passed into the combustion zone and is burned along with carbonized refuse in that zone. Burning of the gaseous mixture provides some heat, destroys the entrained carbonaceous particles and makes possible the completely smokeless combustion of the carbonized refuse in that zone to combustion gases comprising carbon dioxide and water vapor, and to ashes, as described. The entrained combustibles, which may be present in the gas mixture passed into the combustion zone, are also totally burned so that all combustion gases above the level of the carbonized refuse in the combustion zone are smoke-free and a proportion thereof can be readily exhausted from the system in a controlled and safe manner without danger of atmospheric pollution. During such removal they can be passed through a heat exchanger to reduce their heat content and then out an exhaust stack in an amount substantially equal to the proportion of fresh oxygen-containing gases added to the withdrawn combustion gases at a point between the first described condensing zone and the combustion zone.

By regulating the volume balance between the fresh air or other oxygen-containing gases introduced into the system, the combustion gases recycled, and the combustion gases passed from the system, as well as the temperature of the combustion section of the furnace, the efficiency of the system is maintained at a high level, and external commercial fuel need not be added to the combustion zone. Furthermore, through the control of the temperature of the combustion zone by controlled removal of heat through the walls of that zone, it is possible to maintain the volumes of air and combustion gases in the system at a minimum. This is necessary in order to maintain gas velocities below those that will cause trouble in the system by air-lifting the carbonized refuse and causing flying ash problems.

The apparatus of the invention comprises an incinerator in the form of a vertical column having a lower combustion chamber and a plurality of treating chambers (refuse drying, heating and carbonizing zones) disposed in vertically stacked relation above the combustion chamber. An air lock arrangement is provided above the level of the treating chambers in the column so that refuse can be passed down into the treating chambers without introduction of substantial quantities of air into the treating chambers.

Specifically, the open upper end of the column may be provided with a refuse-loading hopper, the floor of which may be formed of a pair of horizontally disposed laterally and horizontally retractable air lock plates which, when abutting each other, form an air seal. This floor is preferably the roof of an air-lock cell, the floor of which is fabricated similar to and functions in the same manner as the previously described retractable air lock plates. Accordingly, refuse can be periodically fed through the hopper down into the column, as by the alternate opening and closing of the described two air locks, while the main part of the column remains sealed off.

The plurality of vertically stacked treating chambers of the main part of the column are separated from one another by horizontally disposed, horizontally laterally retractable pairs of grates which provide a floor for each such chamber while allowing the upward passage of combustion gases therethrough for drying, heating and carbonizing of refuse. The lowermost pair of such grates is directly above the combustion chamber, and is preferably fluid cooled. All pairs of grates and plates feature horizontal orientation and lateral retraction so as to maximize uniformity of build-up of refuse thereon and uniformity of drying, heating and carbonizing of the refuse, and so as to maximize ease of inspection, repair and replacement of the grates and plates during use of the apparatus. One or more sets of furnace grates are also provided upon which the carbonized refuse is converted to smoke-free combustion gases and ashes in the combustion chamber.

Such apparatus also includes a closed conduit from the uppermost treating chamber to a condenser, a combustion gas line from that condenser through a blower into a water-cooled combustion chamber at a point below the level of a set of furnace grates, an air line and a second blower for controlled entry of air into the combustion gas line, a combustion gas exhaust line from the water-cooled combustion chamber through a heat exchanger to an exhaust stack, support means for the column and an ash hopper through which ashes can be removed from the lower end of the combustion chamber. The apparatus can also be controlled readily by means of an electronically activated hydraulic control system coupled to each pair of plates and grates, and, optionally, to valve means in the air inlet line and valve means in the exhaust stack or exhaust line. Moreover, temperature, gas flow and other sensing means can be strategically located at various points in the apparatus. Further features of the invention will be apparent from the following detailed description and the accompanying drawings of which:

FIG. 1 is a schematic front elevation, partly broken away, of one embodiment of the incineration apparatus of the invention;

FIG. 2 is an enlarged, schematic front elevation, partly broken away, of the combustion chamber of the apparatus of FIG. 1;

Figure 3:
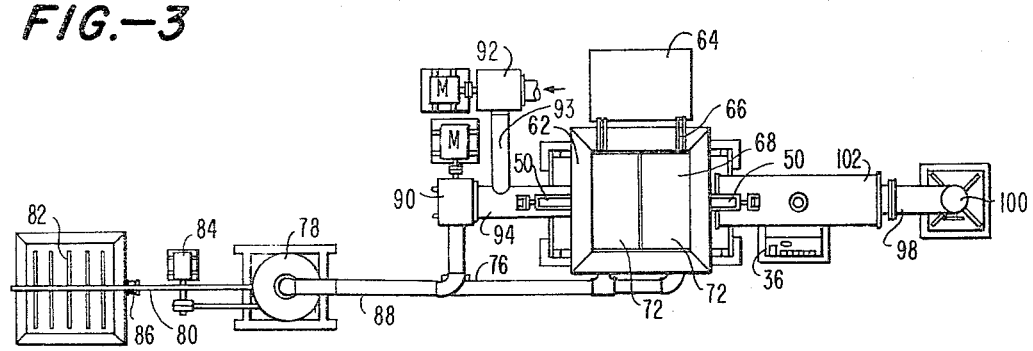
FIG. 3 is a schematic top plan view of the apparatus of FIG. 1.

Now referring to FIG. 1 of the accompanying drawings, a preferred embodiment of the incinerating apparatus of the invention is schematically illustrated in front elevation. The apparatus 10 of FIG. 1 comprises a generally vertical hollow column 12 which may be square in cross section, as shown in FIG. 3, or of any other suitable shape and which is supported above ground on suitable support beams, such as beams 13 (FIG. 1). For major commercial incineration, the column is usually quite large, for example, about 65 feet high, with an average diameter of, for example, 7.5 feet. However, it will be understood that the particular size and shape of the column can be varied according to the particular expected volume throughput of refuse and other factors.

Figure 8:
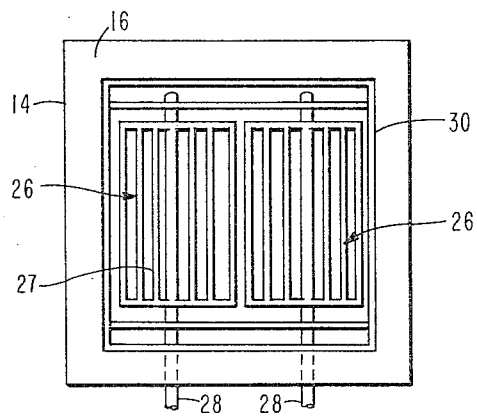
FIG. 8 is a schematic plan view of combustion chamber grates for the apparatus of FIG. 1.

Preferably, the wall of the column 12 is fabricated of steel or the like temperature resistant metal and is lined along most of the interior surface thereof with a layer 16 of refractory material, such as firebrick (FIGS. 1 and 2) or the like, to protect the wall 14 and to reduce heat loss through the wall 14. The column 12 includes a combustion chamber 18 disposed adjacent the lower end 20 thereof, which chamber 18 is fitted with a hinged door 22 with a hinged peephole 24 therein covering an opening (not shown) in the wall 14 at the level of two horizontally aligned vertically spaced sets of furnace grates 26 disposed in the chamber 18. Each grate 26 of each set, as shown in FIG. 8, is a metallic grid 27, such as steel or the like, secured to a cross-bar 28, the bar 28 being pivotally mounted in a steel or other metal frame 30 in the chamber 18. One end of each bar 28 extends out through the column 12 and into connection with an hydraulic actuator 32 which is electronically connected, as through electrical conduits 34, to an electrical control panel 36 (FIG. 1), so that the individual bars 28 can be rotated for dumping of refuse from each set of grates 26.

The upper set of grates 26 is the site of conversion of carbonized refuse to smoke-free combustion gases and ashes. The lower set of grates 26 allows large incombustible items to be removed from the combustion chamber 18 without interrupting the incinerating process. This is accomplished by dumping such refuse from the upper pair of grates 26 to the lower pair of furnace grates 26 and continuing the burning process with added refuse on the upper grates 26 while removing the incombustibles from the lower grates 26, through an ash hopper 38 connected to the open lower end 20 of column 12 and fitted with a retractable cover 39.

As shown more particularly in FIG. 2, the portion 23 of the combustion chamber 18 above refuse level on the uppermost set of grates 26 is preferably water jacketed, as by eliminating the bricks 16 and substituting a wall 25 spaced inwardly from the wall 14 and connected thereto, as by horizontally extending walls 29, to form a water circulating jacket 31, which is supported by the bricks 16 which line the portion 33 of the combustion chamber at the level of the refuse. This jacket 31 has a water inlet 35 at the lower end thereof connected to a water source (not shown) and a water outlet 37 adjacent the upper end thereof connected to a water exhaust system (not shown). It will be understood that the described combustion chamber cooling system can also operate with a fluid other than water or with a gas, such as air, etc.

Figure 4:
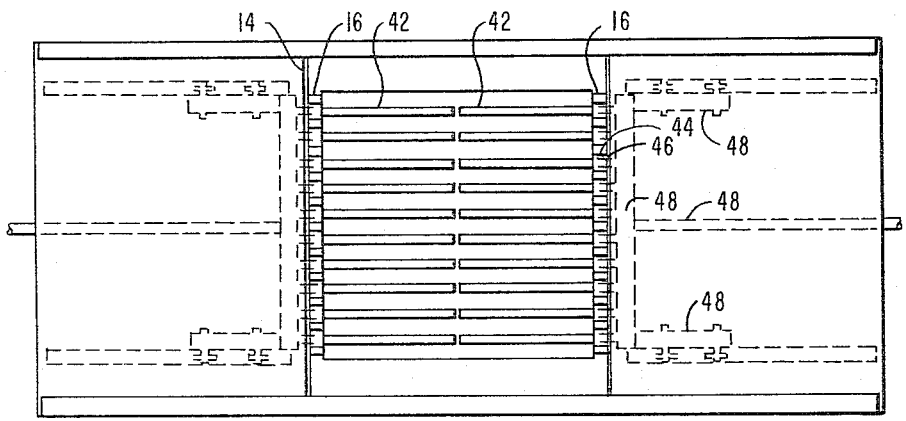
FIG. 4 is a schematic plan view of forked grates for treating chambers of the apparatus of FIG. 1.

The column 12 also includes a plurality (for example ten) of treating chambers 40 disposed in vertically stacked relation above the chamber 18, the floor of each chamber 40 being formed of a pair of air permeable, horizontally aligned, horizontally laterally retractable forked grates 42. Each of the grates 42 is metallic or the like and is movable between a position adjacent the midline of the column, and therefore adjacent or abutting the other member of each such pair of grates, and a position external of the column 12. Preferably each grate 42 can be retracted so that it is wholly outside the column and therefore can be inspected, repaired or replaced with minimum difficulty. Thus, as shown in FIG. 4, each forked grate 42 is retractable through holes 44 in the layer 16 and aligned holes 46 in the wall 14, and includes guide bars 48 connected to hydraulic actuators 50 electronically controlled, as through conduits 34 and panel 36.

Figure 7:
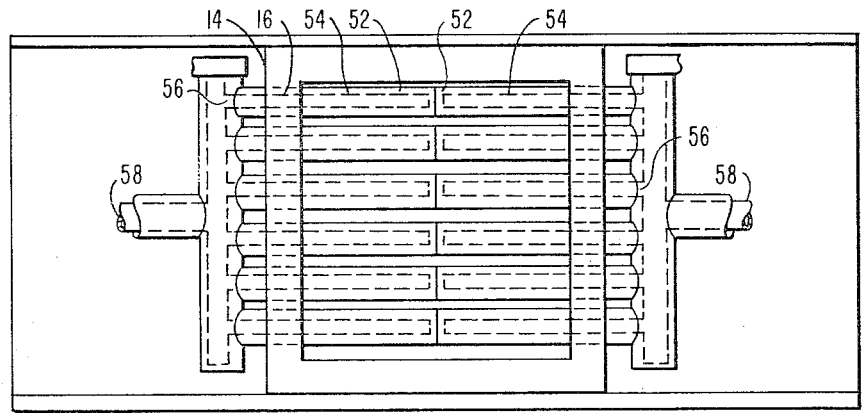
FIG. 7 is a schematic plan view of water-cooled grates for the lowermost treating chamber of the apparatus of FIG. 1.

The lowermost pair of forked grates form the floor of the lowermost treating chamber 40 and the roof of the combustion chamber 18. Accordingly, this pair, designated as 52, must withstand temperatures usually as high as about 1200–1800° F. and occasionally up to about 3000° F. Preferably, the grates 52 are fluid cooled (as by air, water, etc.), as shown in FIG. 7, and may comprise hollow tubes 54 with interconnecting internal passageways 56 coupled to an external source of fluid, as by a conduit 58.

The particular configuration of the pairs of forked grates 42 and 52 is such that refuse of any reasonable size, shape and amount can be held on each pair of grates for a preselected interval of time and can be exposed to countercurrent contact by ascending hot combustion gases from the combustion chamber 18. Since each member of each pair of grates 42 and 52 retracts laterally horizontally, refuse contained thereon during said retraction can be dumped down on the next lower pair of unretracted grates as a uniformly thick pile. There is no substantial funneling of refuse through only a central opening, as in conventional incinerators, with resultant cone-shaped piling of refuse at the next lower level and uneven drying, heating and carbonizing.

Since the grates 42 and 52 extend across the width of the column 16 and since a uniform level of refuse is formed on the next lower pair of unretracted grates during each refuse dumping sequence and since that level extends across the entire width of the column, maximum contact of the refuse is maintained with the countercurrent stream of combustion gases. No channeling or bypassing of the gases occurs. Moreover, the successive drying, heating and full carbonization of the refuse as it intermittently moves from treating chamber to treating chamber down the column 12 at, for example, intervals of 5 minutes each, is wholly uniform, thus assuring complete removal of smoke-producing particles from the refuse into the ascending stream of combustion gases in the treating chambers 40 before the refuse enters the combustion chamber 18. This is an essential feature of the invention, since in the combustion chamber 18, combustion gases are withdrawn from above the refuse level and a proportion of these gases can be exhausted from the apparatus without further treatment. All of the combustion gases above the refuse level in the combustion therefore must be essentially smoke-free. This is achieved by careful, uniform and complete carbonization of the refuse before it enters the combustion chamber 18, due to the uniform cross section or depth of the refuse on each pair of the grates 42 and 52 during incineration and maximum contact with the ascending stream of hot gases.

At the open upper end 60 of the column 12 an open-topped refuse loading hopper 62 is provided into which refuse can be fed, as by a skip loader bucket 64 (FIG. 1) or the like traveling to the top of the hopper 62 on rails 66. A pair of air locks 68 are interposed between the hopper 62 and the uppermost of the treating chambers 40 in order to seal off the treating chambers 40 and the combustion chamber 18 from inadvertent introduction of substantial amounts of air thereinto through the hopper 62. It is essential to the present invention that control be established and maintained over the relative proportions of combustion gases exhausted from the apparatus 10 and air or other oxygen-containing gases added to the apparatus 10. Moreover, it is highly desirable that air or the like not be admitted to the treating chambers countercurrent to the ascending stream of combustion gases and that such combusion gases (laden with smoke particles) not be allowed to escape through the upper end of the column 12. Furthermore, absence of substantial amounts of free oxygen in the treating chamber of column 12 assures that flaming of refuse in the column 12 will be avoided. It is desired to accomplish all drying, heating and carbonizing of the refuse in the absence of flames in order to maximize efficiency of operation.

Accordingly, the two spaced air locks 68 are employed, which air locks define the roof and floor of an air lock chamber 70 in the column 12 above the uppermost treating chamber 40. Refuse can be intermittently passed into chamber 70 and then the upper air lock 68 can be closed and the lower air lock 68 can be opened so that the refuse can pass to the floor of the uppermost treating chamber 40.

Figure 5:
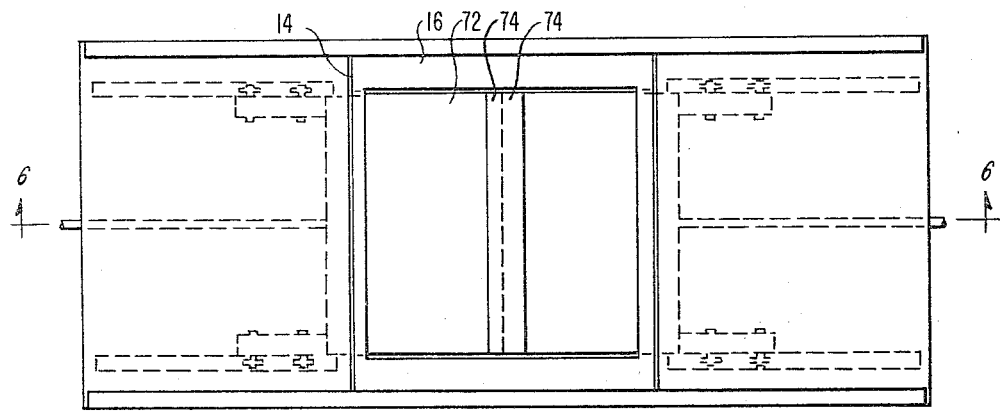
FIG. 5 is a schematic plan view of air lock plates for the apparatus of FIG. 1.
Figure 6:
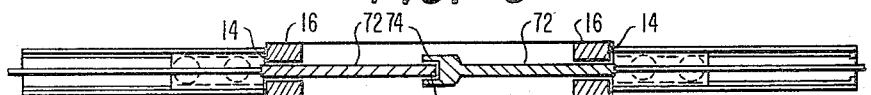
FIG. 6 is a schematic enlarged fragmentary cross-section of the plates of FIG. 5.

Each air lock 68 comprises (FIG. 5) a pair of air impermeable horizontally disposed metal plates 72 which are horizontally laterally retractable generally in the same manner as described for the pairs of forked grates 42 and 52, that is through wall 14 by means of the hydraulic actuators 50 electronically controlled through the conduits 34 and panel 36. Moreover, the plates 72 function in the same manner as the grates 42 and 52 to dump refuse in a uniformly thick layer on the floor of the uppermost treating chamber 40 and across the width thereof when the plates 72 bearing refuse are fully retracted. As shown in FIG. 6, the plates 72 are configured on the adjacent edges 74 thereof to provide an air seal when the edges 74 abut each other. Other suitable air sealing means can be used, as can air sealing means (not shown) surrounding the various openings in the layer 16 and wall 14 through which the forked grates 42 and 52, the furnace grate bars 28, and the plates 72 extend.

The column 12 is provided with a conduit 76 adjacent the uppermost treating chamber 40 but below the air lock chamber 70, through which conduit 76 combustion gases exit the column 12 after passing up through the various treating chambers 40 and refuse disposed on the grates 42 and 52. The conduit 76 passes down into the lower end of a sealed vertical condenser 78 for removal of condensables therefrom. The condenser 78 is water cooled, as by pipes 80 extending in a closed path between the condenser 78 and a spray cooled water tower 82, water being impelled through the pipes 80, as by a circulating pump 84. Valve means 86 may also be provided in pipes 80 for controlling the water flow therein. Means are also provided (not shown) for recovering condensed materials from the condenser 78. Uncondensed combustion gases, which may still contain some entrained smoke-producing carbonaceous particles, pass out of the upper end of the condenser 78 through pipe 88 and into a duct 94 which terminates in the combustion chamber 18 below the lowermost of the two sets of furnace grates 26. Such passage is facilitated by a blower 90. Air or oxygen is passed into duct 94, as by a separately controlled blower 92 and line 93. The blower 92 introduces a controlled concentration of the oxygen-containing gases into admixture with the uncondensed combustion gases, while the blower 90 exerts a suction or vacuum on the conduit 76-condenser 78-pipe 88 system to aid in drawing off the combustion gases from the column 12, as described. Other equivalent means can be employed for accomplishing these purposes.

The resulting admixture of gases passes into the combustion chamber 18 for reburning to smoke-free combustion gases, along with conversion of carbonized refuse on the grates 26 to smoke-free combustion gases and ashes. Ashes pass down through the grates 26 for removal through the ash hopper 38, while smoke-free combustion gases from the gaseous admixture and from the carbonized refuse (burning in a flame-containing or flame-free manner at, for example, 1200–1800° F., but up to about 3000° F.), rise into the upper portion 96 of the combustion chamber above the level of the refuse on the grates 26.

Since the refuse is uniformly distributed across the entire surface area of the upper grates 26 it acts as a trap for the rising burning gaseous admixture so that carbonaceous particles therein do not escape into the upper portion 96 before conversion to ashes and smoke-free combustion gases. Such smoke-free combustion gases are split into two streams, usually at least about 50 percent by volume passing up through the treating chambers 40 as the previously described countercurrently contacting recycle stream of hot combustion gases, and the remainder exiting the combustion chamber through a conduit 98 which extends out from the combustion chamber at a point adjacent the top end thereof and which leads to an exhaust stack 100. The conduit 98 may be provided with a water jacket 102 having a suitable water inlet 103 and water outlet 104, the latter of which, if desired, can be connected to the inlet 35. Accordingly, heat can be recovered from the exhaust combustion gases for suitable uses as, for example, for steam driving the skip loader bucket 64, for generating electrical power, etc. The conduit 98 is provided with valve means 106 such as the damper 108 to control the proportion of exhaust combustion gases exiting the combustion chamber 18.

In operating the device 10 on a continuous basis, loads of refuse in the wet or dry state and in the ground or unground, sorted or unsorted condition are sequentially placed into the hopper 62, as from one or a plurality of the buckets 64, and each load is then passed in turn through the open upper air lock 68 into the air lock chamber 70, whereupon the upper air lock 68 is closed, as by hydraulic actuators 50 operated through conduits 34 and panel 36.

Each load of refuse is spread in a uniformly thick layer over substantially the entire surface of the lower closed air lock 68, and is then dumped down upon the closed grates 42 of the uppermost of the treating chambers as a layer of uniform depth by relatively rapidly fully opening (fully laterally retracting) the lower air lock 68 by means of actuators 50. The lower air lock 68 is opened only when the upper air lock 68 is closed, and in the just described sequence. The lower air lock 68 is then closed so as to seal off the treating chambers 40 and combustion chamber 18. The upper air lock 68 is then opened and the next load of refuse passes into the chamber 70.

Each load of refuse is held on the closed air permeable grates 42 in the uppermost of the treating chambers for a suitable length of time, for example, 5 minutes, to allow substantial contact with combustion gases passing up through the grates 42 from the lower chambers 40 in the column 12, so as to promote flameless and uniform drying and heating thereof. It will be obvious that when the operation is started up, and until the first load of refuse is carbonized, passed into the combustion chamber 18 and burned, another source of heat, such as wood, will be necessary. Subsequently, however, the operation proceeds without introduction of fuel other than the refuse itself.

The grates 42 of the first treating chamber are fully retracted after a suitable interval of time and the load is dumped upon the closed grates 42 of the next lower treating chamber 40 and is held thereon for a suitable length of time, e.g. 5 minutes before being dumped to the next lower chamber 42. The sequence is timed so that as soon as the grates 42 of a given chamber 40 have been fully retracted and refuse has been dumped therefrom to the next lower chamber 40, the grates are closed and the grates 42 of the next higher chamber 40 are then fully retracted and the refuse thereon is dumped upon the now closed grates 42 of the just evacuated chamber 40. Thus, each load of refuse is held for a given length of time as a uniformly thick layer across substantially the entire surface of the grates 42 or 52 of each treating chamber, in turn, down the column 12, with simultaneous treatment of separate loads of refuse in each of the chambers 40 down the entire column.

In an identical manner, each fully and flamelessly carbonized load of refuse from the lowermost treating chamber passes, in turn, into the combustion chamber 18 and is converted (as a uniform layer on the upper grates 26) into ashes and combustion gases. The ashes are periodically removed from the combustion chamber out through the hopper 38, not necessarily in timed sequence with the remainder of the operation. However, conversion of successive loads of refuse to combustion gases and ashes on the upper grates 26 in the combustion chamber 18 and holding of successive loads of refuse in the air lock chamber 70 do occur simultaneously with and in the same timed sequence with the described treatment in the treating chambers. The timed sequence of movement of the individual loads of refuse down the column 12 is automatically or manually controlled through the control panel 36 and conduits 34 and hydraulic actuators 50 interconnected therewith.

The combustion gases are continuously drawn off through the conduit 76 above the refuse and below the lower air lock 68 by means of a partial suction or vacuum provided by the furnace blower 90 and such gases pass into the condenser 78. Condensables are continuously removed therefrom in the condenser 78 and the remaining gases continuously exit the condenser 78 through the pipe 88 and into the air duct 94 with the aid of the blower 90, and are admixed with controlled amounts of air in duct 94, introduced thereinto from the air entry line 93. This admixture continuously passes into the combustion chamber 18 below the grates 26 for burning to smoke-free combustion gases. Such admixture also passes up into fully carbonized refuse on the upper furnace grates 26 during conversion of such refuse to smoke-free combustion gases and ashes, and the resultant combined combustion gases exit the chamber 18 in relative proportions controlled by the damper 108 in the conduit 98. Thus, a controlled proportion of the smoke-free combustion gases continuously exits the chamber 18 via the conduit 98 and exhaust stack 100 as exhaust gases, with heat being recovered therefrom, as by heat exchanger 102, and the remaining proportion of smoke-free combustion gases continuously exits the chamber 18 via the grates 52 (and refuse thereon) in the lowermost treating chamber 40 as recycling combustion gases. The latter proportion continuously passes up through the ten treating chambers 40 as the countercurrently contacting stream of hot combustion gases and continuously exits the column as previously described, such gases simultaneously drying the loads of refuse in the uppermost chambers, heating the loads of refuse in the intermediate chambers and stripping smoke-producing particles therefrom, and fully carbonizing the loads of refuse, at the latest, by the time the loads of refuse reach the lowermost treating chamber 40 and are retained therein for the predetermined holding time.

Further features of the invention are illustrated in the following examples:

*Example I*

An improved incineration apparatus substantially identical to that illustrated in the accompanying drawings is operated in a continuous manner for the smokeless incineration of combustible refuse. The apparatus includes a hollow vertical steel column about 60 feet high and supported on 9 ft. high I-beam columns set onto a concrete pad. A 100 cu. ft. capacity load bucket is mounted on rails running to the upper end of the column between the I-beams.

The column is substantially square in horizontal cross section with an internal diameter of 7 feet, and is lined throughout most portions thereof with a 6 inch thick layer of high temperature refractory. The column is divided into ten vertically stacked treating chambers, each of about 175 cu. ft. volume, an air lock chamber of equal proportions disposed immediately above the uppermost treating chamber, an open-topped loading hopper of about 100 cu. ft. capacity disposed above the air lock chamber, and combustion chamber of about 500 cu. ft. capacity, the upper portion of which (above the refuse level therein) is water jacketed. The combustion chamber is disposed immediately below the lowermost treating chamber. The combustion column is provided at the lower end thereof with a steel ash hopper with retractable lid.

Hydraulically operated horizontally disposed and horizontally retractable pairs of steel forked grates form the floor of each treating chamber, the lowermost pair comprising forked hollow steel tubes, O.D. 3½″, I.D. 3″, connected external of the column to water conduits. Two pairs of vertically spaced, horizontally disposed and horizontally laterally retractable solid plates form the roof and floor, respectively, of the air lock chamber. The combustion chamber is fitted with two vertically spaced horizontal sets of steel forked grates which are rotatable, for ash dumping, by hydraulic actuators controlled by an electric control panel. The control panel is also interconnected with hydraulic actuators operating each of the members of each of the described pairs of plates and grates.

An 8½ inch O.D., 8 inch I.D. steel pipe is connected through the column wall and runs into communication with the upper portion of the uppermost treating chamber. This pipe runs to the bottom of a water cooled condenser column operating at 160° F., and a similar pipe conveys gases from the top part of the condenser and into an 8 inch duct into which is set a blower. The duct communicates with an air entry line running from a second, separately controlled blower. Accordingly, combustion gases and air are mixed therein and fed to the combustion chamber.

Smoke-free combustion gases exit the combustion chamber through a water jacketed 16 inch pipe and into a 16 inch diameter, 75 foot high vertical exhaust stack. A damper is set into the jacketed pipe adjacent to the stack as a means for controlling the volume of gases exhausted out the stack.

The incineration apparatus is operated continuously on a 24 hour basis in the following manner: a plurality of 70 cu. ft., approximately 1,000 lb. loads of refuse are intermittently passed into and down the column in timed sequence, with a holding time per load per chamber of 6 minutes or ten loads/hr. per chamber (10 second opening and closing times for each pair of grates and plates). The total capacity of refuse completely incinerated per hour is approximately 5 tons, for a total operating capacity per day (24 hours) of approximately 125 tons. The refuse is unsorted, unground and of all types and reasonable size. The combustion chamber operates at an average temperature of 2500° F., (from about 2000° F. to about 3000° F.) with an average volume of 700,000 cu. ft. of makeup gas (air) added to the apparatus per hour at the damper in the air duct, and an about equal volume of smoke-free combustion gases exhausted per hour through the stack. This volume is approximately equal to the volume of gases recycled up through the column.

The apparatus is continuously operated for 1 month, without any repairs and with minimal manual manipulation. The refuse loads in each chamber are uniformly thick in depth and are sequentially uniformly dried, heated, and carbonized and converted to smoke-free combustion gases and ashes. Intermittent ash removal is employed and complete incineration is obtained with essentially no smoke production. No externally introduced commercial fuel (coal, water-gas, etc.) is used during this time, except for wood employed during initial start-up of the apparatus.

*Example II*

The apparatus of Example I is successfully employed for a 3 week period in a continuous incineration process having the following operating parameters:

| | |
|---|---|
| Weight of refuse per load _____lbs__ | 800 |
| Total capacity per hour _____tons__ | 4 |
| Total capacity per day _____do___ | 100 |
| Loading cycle _____mins__ | 6 |
| Volume input of air and output (exhaust) of combustion gases/hr. _____#550,000–600,000 | |
| Average combustion chamber temp. _____° F__ | 2300 |
| Volume percentage of air input to combustion gas recycle _____%__ | 100 |

The preceding examples clearly illustrate that the improved process of the invention can be successfully carried out on a continuous basis for an extended period of time. The process can also be used on a batch or intermittent basis. The process is capable of completely incinerating large volumes of wet or dry, ground or unground combustible refuse to smoke-free combustion gases and ashes in a highly efficient manner not requiring external commercial fuel (except for start-up of the process). The combustible refuse is sequentially uniformly dried, heated, carbonized and converted to smoke-free combustion gases and ashes, by maintaining the refuse in layers of substantially uniform thickness during countercurrent contacting with hot combustion gases. The relative proportions of combustion gases recycled and exhausted and air added to the system are controlled to sustain maximum efficiency in the process. The preceding examples also clearly illustrate that the improved apparatus of the invention is capable of efficiently carrying out the process and is durable and adaptable, not requiring frequent repairs and otherwise generally lending itself to sustained continuous operation. Further advantages of the invention are as set forth in the foregoing.

Various modifications, changes, additions and substitutions can be in the present process, the steps and parameters thereof, and the present apparatus, components and operating conditions therefor. All such changes, modifications, additions and substitutions which are within the scope of the appended claims form a part of the invention.

What is claimed is:

1. An improved incinerating apparatus, said apparatus comprising, in combination, a generally vertical hollow incinerator column, including a lower combustion chamber having refuse retaining means and a plurality of flameless treating chambers adapted to retain refuse for drying, distilling and carbonizing without combustion, and disposed in generally vertically stacked relation above said combustion chamber, horizontally retractable refuse holding means comprising the floor of each of said treating chambers, means for introducing refuse into the uppermost of said treating chambers while restricting gas flow thereto, means for withdrawing combustion gases only from said uppermost of said treating chambers, means for mixing said withdrawn combustion gases with a controlled concentration of oxygen-containing gas and for returning the resultant mixture to said combustion chamber below said refuse retaining means, and means for withdrawing a controlled concentration of excess combustion gases from said combustion chamber above said refuse retaining means and below said treating chambers and for passing said withdrawn excess combustion gases from said apparatus.

2. The apparatus of claim 1 wherein said combustion chamber includes fluid cooling means in the upper portion thereof above said refuse retaining means and wherein means are disposed external of said column and connected to said combustion gas withdrawal means for removal of condensables from said withdrawn combustion gases.

3. An improved incinerating apparatus, said apparatus comprising, in combination, a generally vertical hollow incinerator column which includes a lower combustion chamber and a plurality of flameless treating chambers adapted to retain refuse for drying, distilling and carbonizing without combustion, and disposed in generally vertically stacked relation above said combustion chamber, at least one set of furnace grates in said combustion chamber, said combustion chamber including a water jacketed portion above said furnace grates, a plurality of pairs of horizontally disposed, laterally horizontally retractable, air permeable grates defining the floor of each of said treating chambers and the roof of said combustion chamber, an openable air lock simultaneously defining the roof of the uppermost of said treating chambers and the floor of an air lock chamber disposed above said uppermost treating chamber adjacent the upper end of said column, whereby said treating chambers are sealable from entry of air through said upper end of said column, means for withdrawing combustion gases only from adjacent said upper end of said column but below said air lock, means for mixing said withdrawn combustion gases with a controlled concentration of oxygen-containing gas and for returning the resultant mixture to said combustion chamber below said furnace grates, and means for withdrawing a controlled concentration of excess combustion gases from said combustion chamber above said furnace grates and below said treating chambers and for passing said withdrawn excess combustion gases from said apparatus.

4. The apparatus of claim 3 wherein means are disposed external of said column and connected to said combustion gas withdrawal means for removal of condensables from said withdrawn combustion gases, wherein said upper end of said column includes an open-topped refuse receiving means, wherein a second openable air lock is disposed in vertically spaced relation above said first described air lock and below said refuse receiving means and in communication therewith, and wherein ash removal means are disposed below said sets of furnace grates in said column.

5. The apparatus of claim 4 wherein said means for withdrawing combustion gases from adjacent the upper end of said column includes conduit means and vacuum means disposed in said conduit means, wherein said mixing means includes blower means for controlling the volume of oxygen-containing gases passed into admixture with uncondensed combustion gases, and wherein said means for withdrawing excess combustion gases from said combustion chamber includes blower means, whereby improved control over the relative proportions of oxygen-containing make-up gases added to said combustion gases, recycled combustion gases and exhaust gases is provided.

6. The apparatus of claim 5 wherein said first and said second air locks each comprise a horizontally disposed, laterally horizontally retractable pair of air-impermeable plates and wherein each of said plates and each of said grates of said pairs of grates is movable between a position adjacent the midline of said column and a position substantially external of said column, whereby each of said plates and each of said grates is readily inspectable, repairable and replaceable.

7. Apparatus of claim 6 wherein the lowermost of said pairs of grates includes fluid cooling means, and wherein two sets of movable furnace grates are disposed in said combustion chamber in substantially horizontal position and in vertically spaced relation from one another.

8. Apparatus of claim 7 wherein electronically actuatable hydraulic means are connected to each of said pairs of plates and each of said pairs of grates for controlled lateral horizontal movement thereof.

9. An improved process for incinerating refuse, which process comprises the steps of passing refuse downwardly in countercurrent contact with an upwardly moving stream of hot combustion gases in the substantial absence of externally introduced air, and sequentially essentially uniformly flamelessly drying, heating and substantially completely carbonizing said refuse without combustion, and essentially completely releasing smoke-producing volatiles from said refuse into said stream, while maintaining said refuse during said countercurrent contacting in a layer of substantially uniform thickness across substantially the entire path of movement of said stream, passing said carbonized refuse into a combustion zone and combusting said refuse essentially completely to ashes and smoke-free combustion gases, passing a substantial proportion of said combustion gases from said carbonized refuse as said stream for said countercurrent contacting, exhausting the remainder of said combustion gases from said combustion zone, withdrawing said stream, after countercurrent contacting of said refuse, adjacent the upper end of said path of said refuse and returning said withdrawn combustion gas stream in admixture with fresh oxygen-containing gas to said combustion zone for combustion, the proportion of said oxygen-containing gas added to said withdrawn combustion gas being sufficient to replace the volume of combustion gases exhausted from said combustion zone, incinerating said mixture of oxygen-containing gases and returned combustion gases in said combustion zone during reduction of said carbonized refuse to ashes and smoke-free combustion gases, and balancing heat utilization and dissipation with heat output to maintain high temperature combustion in the absence of externally introduced fuel.

10. The method of claim 9 wherein said withdrawn combustion gases are passed into and through a condensation zone external of the path of said refuse and condensables are removed from said withdrawn combustion gases before said withdrawn combustion gases are admixed with said oxygen-containing gas.

11. An improved process for incinerating refuse, which process comprises the steps of passing refuse downwardly in countercurrent contact with an upwardly moving stream of hot combustion gases in the substantial absence of externally introduced air, and sequentially flamelessly essentially uniformly drying, heating and substantially completely carbonizing said refuse without combustion, and essentially completely releasing smoke-producing volatiles from said refuse into said stream, while maintaining said refuse during said countercurrent contacting in a layer of substantially uniform thickness across substantially the entire path of movement of said stream, passing said carbonized refuse into a combustion zone and combusting said refuse essentially completely at an elevated temperature to ashes and smoke-free combustion gases, passing said ashes from said combustion zone and passing at least about 50 percent by volume of said combustion gases from said carbonized refuse as said stream for said countercurrent contacting while exhausting the remainder of said combustion gases (from said refuse) out said combustion zone at a point above the level of refuse in said zone, withdrawing said stream, after countercurrent contacting of said refuse, adjacent the upper end of said path of said refuse and returning said withdrawn combustion gas stream in admixture with fresh oxygen-containing gas to said combustion zone for reburning, the proportion of said oxygen-containing gas added to said withdrawn combustion gas being just sufficient to replace the volume of combustion gases exhausted from said combustion zone, whereby the gas volume is substantially maintained, flamelessly combusting said mixture of oxygen-containing gases and returned combustion gases in said combustion zone during combustion of said carbonized refuse to ashes and smoke-free combustion gases, and maintaining a heat balance by dissipating excess heat.

12. The method of claim 11 wherein said withdrawn combustion gases are passed into and through a condensation zone external of the path of said refuse and condensables are removed from said withdrawn combustion gases before said withdrawn combustion gases are admixed with said oxygen-containing gas.

13. An improved continuous process for incinerating refuse, which process comprises the steps of sequentially and intermittently passing refuse down through a plurality of vertically stacked, air-permeable treating zones in the substantial absence of externally introduced air, holding said refuse as a layer of substantially uniform depth in each of said treating zones for a time sufficient to facilitate countercurrent contacting thereof with an upwardly moving stream of hot combustion gases, simultaneously effecting said countercurrent contacting so as to flamelessly and essentially uniformly and sequentially dry, heat and substantially completely carbonize said refuse without combusting it during travel of said refuse from the uppermost of said treating zones to the lowermost of said treating zones and to essentially completely release smoke-producing volatiles from said refuse into said countercurrent stream, sequentially intermittently passing said carbonized refuse from said lowermost treating zone into a combustion zone disposed below said lowermost treating zone and combusting said refuse to ashes and smoke-free combustion gases therein, intermittently passing said ashes from said combustion zone and continuously passing at least about 50% by volume of the combustion gases evolving from said refuse in said combustion zone upwardly from said combustion zone as said countercurrent stream while simultaneously exhausting the remainder of the combustion gases from said refuse in said combustion zone out said combustion zone, continuously withdrawing said countercurrent stream from adjacent the uppermost of said treating zones and continuously admixing said withdrawn stream external of said treating zone and said combustion zone with an amount of free oxygen-containing gases proportional to the amount of combustion gases being exhausted from said combustion zone, whereby the volume of gas is maintained substantially constant, continuously passing the resultant gaseous mixture into said combustion zone below said refuse and reburning said mixture during conversion of said carbonized refuse to ashes and combustion gases and dissipating excess heat, whereby the heat balance is maintained, said dissipating being effected by heat exchanging with water coolant in contact with a portion of said combustion zone.

14. The improved process of claim 13 wherein said withdrawn stream of combustion gases is continuously passed into and through a condensation zone disposed external of said treating zones and said combustion zone, continuously removing condensables from said withdrawn combustion gases in said condensing zone and continuously passing remaining uncondensed withdrawn combustion gases from said condensing zone toward said combustion zone while effecting said admixing.

References Cited by the Examiner

UNITED STATES PATENTS

| | | | |
|---|---|---|---|
| 501,761 | 6/1893 | Best et al. | 110—11 X |
| 1,094,503 | 4/1914 | Wasley | 110—8 |
| 1,691,462 | 11/1928 | Borge. | |
| 1,759,042 | 5/1930 | De Carie | 110—17 |
| 1,776,914 | 9/1930 | Langford. | |
| 2,811,937 | 11/1957 | Bouchard | 110—8 |

JAMES W. WESTHAVER, *Primary Examiner.*

FREDERICK L. MATTESON, JR., *Examiner.*

H. B. RAMEY, *Assistant Examiner.*